United States Patent
Thompson

[15] 3,696,516
[45] Oct. 10, 1972

[54] SCOPE TUBE WITH OCULAR RETAINER RING

[72] Inventor: John F. Thompson, El Paso, Tex.

[73] Assignee: W. R. Weaver Company

[22] Filed: March 23, 1971

[21] Appl. No.: 127,315

[52] U.S. Cl. .................................33/245, 285/89
[51] Int. Cl. ......................F41g 1/38, F41g 1/42
[58] Field of Search .........285/81, 89; 33/50; 350/10

[56] References Cited
UNITED STATES PATENTS 904,673  11/1908  Bideker .......................285/89

Primary Examiner—Leonard Forman
Assistant Examiner—Paul G. Foldes
Attorney—Donald R. Motsko, H. Samuel Kieser and William W. Jones

[57] ABSTRACT

A retaining ring is snap-fitted onto a telescopic gunsight tube behind an ocular housing to prevent the ocular housing from being accidentally removed from the tube, thus nitrogen gas in the interior of the scope cannot be accidentally released therefrom.

4 Claims, 5 Drawing Figures

PATENTED OCT 10 1972
3,696,516
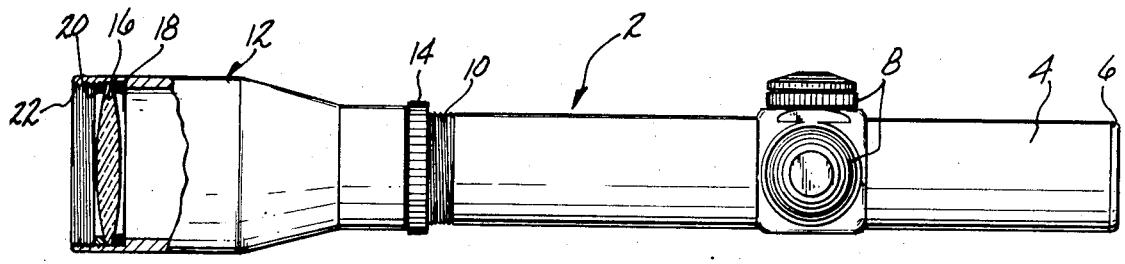
FIG-1
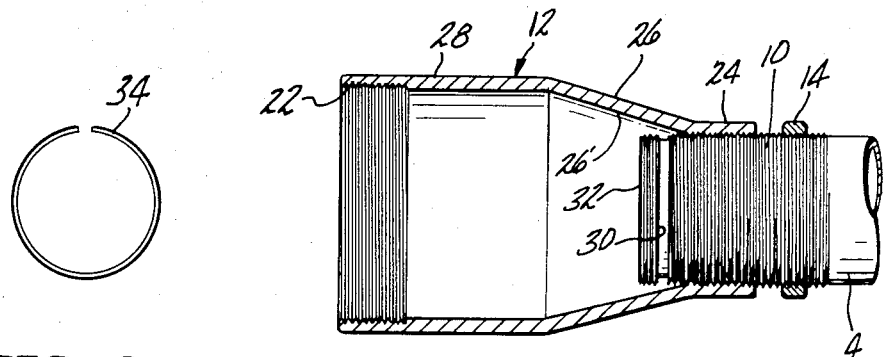
FIG-3
FIG-2
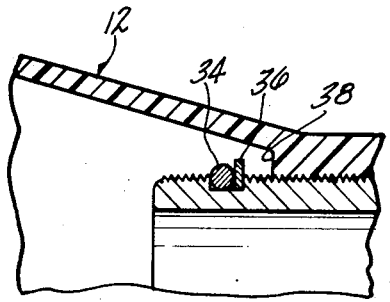
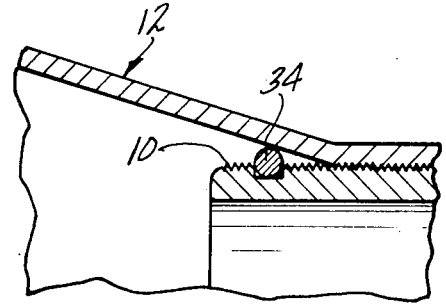
FIG-5
FIG-4
JOHN F. THOMPSON
INVENTOR
BY William W. Jones
ATTORNEY

3,696,516

SCOPE TUBE WITH OCULAR RETAINER RING

This invention concerns a telescopic gunsight having a main barrel, or tubular body portion, an ocular body portion threadedly mounted thereon, and a ring mounted on the body portion of the scope to prevent the ocular body from being accidentally unscrewed from the remainder of the scope.

Modern telescopic gunsights include ocular and objective lenses mounted in opposite ends of a tubular barrel or body, and internal lenses within the barrel for erecting the image viewed through the scope. The internal, or erector lenses are also commonly adapted for lateral movement so as to shift the image viewed while maintaining a centered reticle to correct for windage and elevation errors. In order to reduce lens reflection, the lenses are commonly coated with a material having a low index of refraction, and the ocular and objective lenses are mounted with sealing gaskets so as to keep moisture, dirt, and the like from entering the scope tube. The scope tube may also be filled with a dry gas, such as nitrogen, which prevents fogging of the internal lenses when the scope is subjected to large changes in environmental temperature, or very humid environments.

The main scope tube can be made as a one-piece or unitary body having its end portions radially outwardly flared so as to receive the objective and ocular lenses, or the scope can be made from two or more tubes threadedly connected. In the latter case, the scope can be made from a variety of materials, for example, the main scope barrel can be made from metal, and the ocular tube can be made from another metal or plastic.

One problem which has arisen in connection with the scopes made from a main barrel portion and a separate ocular tube portion threaded onto the main barrel portion concerns the accidental removal of the ocular tube from the main scope barrel during focussing of the ocular on the reticle, or by someone unfamiliar with the scope, such as a child. If the ocular tube is thus removed from the main scope barrel, the nitrogen gas in the barrel escapes, and dirt and moisture will enter the interior of the scope. The internal optics of the scope will then become easily fogged, and dirty, thus requiring cleaning and return to the factory to be recharged with nitrogen.

The scope structure of this invention includes a main scope barrel containing internal erector lenses, reticle means, and an ocular lens tube threadedly mounted on one end of the main scope barrel. A snap ring is fitted onto the main scope barrel behind the ocular tube after the latter is threaded onto the barrel so as to prevent the ocular tube from being screwed off of the barrel.

It is, therefore, an object of this invention to provide a telescopic gunsight construction having a main barrel portion and an ocular tube threaded thereon, with a snap ring fitted onto the barrel to prevent the ocular tube from being accidentally removed from the barrel.

This, and other objects and advantages of the telescopic gunsight of this invention will become more readily apparent from the following detailed description of a preferred embodiment of the invention taken in conjunction with the accompanying drawings, in which:

FIG. 1 is a plan view, partially in section, of a preferred embodiment of a telescopic gunsight formed in accordance with this invention;

FIG. 2 is a sectional view of the ocular end portion of the scope of FIG. 1 threaded onto the mail barrel portion and before the ocular lenses are mounted therein;

FIG. 3 is a plan view of a snap ring for use in the scope construction of this invention;

FIG. 4 is an enlarged sectional view of the joint between the ocular tube and the barrel showing the snap ring mounted in place; and FIG. 5 is a sectional view similar to FIG. 4 but showing a modification of the invention using a snap ring and associated thrust washer with a plastic ocular tube.

Referring now to the drawings, FIG. 1 shows a telescopic gun sight designated generally by the numeral 2. The scope 2 includes a main barrel portion 4 of tubular configuration in which are housed conventional erector lenses, a reticle, and objective lenses, all of which are conventional and form no part of this invention. The internal lenses in the barrel 4 are not shown for purposes of clarity, and for reference purposes, the objective end of the barrel 4 is at 6. Conventional windage and elevation turrets 8 are mounted on the barrel 4 intermediate its ends. The end of the barrel 4 opposite the objective end 6 is threaded externally as at 10 so as to threadedly receive an ocular tube 12 having complimentary internal threads. A lock nut 14 is screwed onto the barrel threads 10 forward of the ocular tube 12. The ocular tube 12 contains an ocular lens 16 seated against a rubber seal ring 18 and held in place by a lock nut 20 screwed into a threaded counterbore 22 in the ocular tube. Thus the interior of the scope forward of the ocular lens 16 and rearward of the objective lens is sealed to contain nitrogen gas within the scope, and to keep moisture and dirt out of the interior of the scope.

As can be seen most clearly in FIG. 2, the ocular tube 12 includes a first reduced portion 24 of smallest diameter which is internally threaded to permit the ocular tube 12 to be screwed onto the barrel 4. The reduced portion 24 merges into a radically outwardly tapered portion 26 which in turn merges into an enlarged diameter portion 28. The threaded part 10 on the barrel 4 is provided with a groove 30 closely adjacent to its end wall 32.

The ocular tube 12 is screwed onto the threaded barrel part 10 for a length sufficient to dispose the groove 30 opposite the interior surface 26' of the ocular tube taper 26 so as to provide clearance between the surface 26' and the groove 30. A split resilient metallic retainer ring 34 is then slipped into the groove 30 so as to protrude above the surface of the threads 10 (see FIG. 4) and thereby provide a protrusion which prevents the ocular tube 12 from being threaded off of the threads 10 without first moving the ring 34. Thus the ocular tube 12 cannot be accidentally removed from the scope barrel 4.

In the event that the ocular tube 12 is made of plastic material, it is preferred to position a thrust washer 36, which is split and has a rectangular, cross-sectional configuration, between the retainer ring 34 and a radial shoulder 38 on the ocular tube 12. The provision of the washer 36 minimizes distortion of the plastic ocular tube 12 and the force of the ocular tube is distributed over the larger bearing surface of the thrust washer.

After the retainer ring 34, and the washer 36, if necessary, are in position, the interior of the scope is filled with nitrogen gas and the ocular lens 16 is mounted in the ocular tube 12 to seal the interior of the scope. The ocular tube 12 is then longitudinally adjusted to focus the ocular lens 12 and the lock ring 14 is screwed against the adjusted ocular tube 12 to secure the latter against further forward movement along the barrel 4.

Thus it is readily apparent that the retainer ring will prevent the ocular tube tube from being accidentally withdrawn from the scope barrel ensuring that the interior of the scope will be protected from fogging, moisture, and dirt infiltration. Furthermore, the provision of a thrust washer in conjunction with the retainer ring permits the use of the invention with plastic ocular tubes without imparting undue deformation to the plastic ocular tube.

Since many changes and variations of the disclosed embodiments of the invention may be made without departing from the inventive concept, it is not intended to limit the invention otherwise than as required by the appended claims.

What is claimed is:

1. A telescopic gunsight comprising:
   a. a main tubular barrel portion having one end portion thereof formed with external threads;
   b. a tubular ocular housing having an internal threaded portion sized to be threadedly mounted on said external threads on said main barrel portion, said ocular housing including a wall part outwardly spaced from said main barrel portion threads to form an annular space therebetween; and
   c. means mounted on said main barrel portion threads in said annular space, said means being longitudinally immobilized on said main barrel portion threads and projecting above said main barrel portion threads to prevent said ocular housing from being threadedly removed from said main barrel portion.

2. A telescopic gunsight comprising:
   a. a main tubular barrel portion having an externally threaded end portion, said threaded end portion including a groove closely spaced from one end surface of said barrel portion;
   b. ocular housing means threadedly mounted on said threaded end portion of said barrel portion, said ocular housing means including an outwardly tapering side wall in the area of said groove to make the latter accessible from one end of said ocular housing means; and
   c. ring means mounted in said groove and operable to prevent said ocular housing means from being unscrewed from said threaded end portion of said barrel.

3. The telescopic gunsight of claim 2, wherein said ring means above the top of said groove to interrupt said threaded portion of said barrel.

4. The telescopic gunsight of claim 2, further comprising resilient thrust washer means mounted in said groove between said ring means and said ocular housing means to provide a large force-bearing surface for said ocular housing to minimize deformation of the latter.

* * * * *

UNITED STATES PATENT OFFICE
CERTIFICATE OF CORRECTION

Patent No. 3,696,516　　　　　　　　　　Dated October 10, 1972

Inventor(s) John F. Thompson

It is certified that error appears in the above-identified patent and that said Letters Patent are hereby corrected as shown below:

In Col. 3, line 7, please delete "tube" second occurrence;

In Col. 4, line 23, please insert --projects-- after the word "means".

Signed and sealed this 13th day of February 1973.

(SEAL)
Attest:

EDWARD M. FLETCHER, JR.　　　　　　ROBERT GOTTSCHALK
Attesting Officer　　　　　　　　　　Commissioner of Patents